(12) United States Patent
Martin et al.

(10) Patent No.: US 11,513,982 B2
(45) Date of Patent: Nov. 29, 2022

(54) TECHNIQUES FOR RECOMMENDING CONFIGURATION CHANGES USING A DECISION TREE

(71) Applicant: EMC IP Holding Company LLC, Hopkinton, MA (US)

(72) Inventors: Owen Martin, Hopedale, MA (US); Fatemeh Azmandian, Raynham, MA (US); Peter Beale, Acton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 100 days.

(21) Appl. No.: 17/038,041

(22) Filed: Sep. 30, 2020

(65) Prior Publication Data

US 2022/0100684 A1 Mar. 31, 2022

(51) Int. Cl.
  *G06F 13/20* (2006.01)
  *G06N 20/00* (2019.01)
  *G06N 5/02* (2006.01)
(52) U.S. Cl.
  CPC ............. *G06F 13/20* (2013.01); *G06N 5/022* (2013.01); *G06N 20/00* (2019.01); *G06F 2213/40* (2013.01)
(58) Field of Classification Search
  CPC .......... G06F 13/20; G06F 13/36; G06F 13/38; G06F 13/4004; G06F 13/4009; G06F 13/28; G06F 2216/01; G06F 2213/40; G06F 2213/4004; G06F 2213/4002
  See application file for complete search history.

(56) References Cited

U.S. PATENT DOCUMENTS

| | | | |
|---|---|---|---|
| 7,949,637 B1 | 5/2011 | Burke | |
| 9,152,349 B2 | 10/2015 | Yochai | |
| 10,122,782 B2* | 11/2018 | Stiers | ....................... H04L 67/10 |
| 10,282,107 B1* | 5/2019 | Martin | ................... G06F 3/0689 |
| 10,567,855 B2* | 2/2020 | Van De Groenendaal | ................... G08C 17/02 |
| 10,791,168 B1* | 9/2020 | Dilley | ...................... H04L 41/22 |
| 2017/0099203 A1* | 4/2017 | Shapur | ................ H04L 67/1034 |

(Continued)

OTHER PUBLICATIONS

Wikipedia, "k-means clustering," https://en.wikipedia.org/wiki/K-means_clustering, Sep. 24, 2020.

*Primary Examiner* — Raymond N Phan
(74) *Attorney, Agent, or Firm* — Muirhead and Saturnelli, LLC

(57) ABSTRACT

Recommending configuration changes may include: receiving a decision tree comprising levels of nodes, wherein the decision tree includes leaf nodes each representing a different one of a plurality of hardware configurations, wherein a first leaf represents a first hardware configuration and the first leaf node is associated with a set of I/O workload features denoting a I/O workload of a first system having the first hardware configuration, wherein the set of I/O workload features is associated with an action from the first leaf node to a second leaf node, wherein the second leaf node represents a second hardware configuration and the action represents a hardware configuration change made to transition from the first to the second hardware configuration; and performing processing that determines, using the decision tree, a recommendation for a hardware configuration change for a second system having the first hardware configuration represented by the first leaf node.

23 Claims, 9 Drawing Sheets

(56) References Cited

U.S. PATENT DOCUMENTS

2017/0346690 A1* 11/2017 Dorado ............... H04L 41/0823
2021/0342712 A1* 11/2021 Ferreira ................... G06N 5/04

* cited by examiner

TECHNIQUES FOR RECOMMENDING CONFIGURATION CHANGES USING A DECISION TREE

BACKGROUND

Technical Field

This application generally relates to data storage.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for recommending configuration changes comprising receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and performing first processing that determines, using the decision tree, a recommendation for a hardware configuration change for a second system currently having the first hardware configuration represented by the first leaf node.

In at least one embodiment, the first processing may include: searching the decision tree for one of the plurality of leaf nodes having an associated one of the plurality of hardware configurations that matches a current hardware configuration of the second system, wherein said searching determines the first leaf node represents the first hardware configuration that matches the current hardware configuration of the second system; and ranking a plurality of hardware configuration changes represented by a plurality of actions associated with the first leaf node, wherein the plurality of hardware configuration changes includes the first hardware configuration change and wherein the plurality of actions includes the first action. Ranking the plurality of hardware configuration changes is performed in accordance with one or more criteria. The first processing may include selecting the first hardware configuration change from the plurality of hardware configuration changes in accordance with the one or more criteria. The first hardware configuration change for the second system may be implemented resulting in the second system having the second hardware configuration represented by the second leaf node.

In at least one embodiment, the one or more criteria may include any one or more of: a plurality of costs associated with the plurality of hardware configuration changes, a plurality of expected I/O response times for the plurality of hardware configuration changes, and a plurality of percentages each denoting a percentage of time that one of the plurality of configuration changes has been previously selected and performed.

In at least one embodiment, the first processing may be performed responsive to an occurrence of a trigger condition. The trigger condition may include determining that the second system has allocated a current percentage of physical storage and the current percentage is greater than a specified threshold. The trigger condition may include determining that the second system has a current I/O response time that exceeds a specified threshold. The trigger condition may include determining that the second system has current I/O rate that exceeds a specified threshold.

In at least one embodiment, processing may include associating a new set of I/O workload features with the first leaf node. Processing may include clustering a plurality of I/O workload data points and associated sets of I/O workload features, wherein said clustering may include forming one or more clusters of I/O workload data points having associated sets of I/O workload features. Clustering may cluster the plurality of I/O workload data points along a plane of average I/O size and percentage of write I/O operations. Processing may include binning the plurality of I/O workload data points. A first axis of the plane corresponding to the average I/O size may be partitioned into a first plurality of bins and a second axis of the plane corresponding to the percentage of write I/O operations may be partitioned into second plurality of bins. Each of the plurality of I/O workload data points may be located in one of the first plurality of bins and in one of the second plurality of bins. Clustering may include determining a plurality of counts wherein each of the plurality of counts is associated with a first particular one of the first plurality of bins and a second particular one of the second plurality of bins, and wherein said each count may denote a total quantity of the plurality of I/O workload data points located in the first particular one of the first plurality of bins and also located in the second particular one of the second plurality of bins.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA), or back-end adapter (BEA) as described in more detail herein, or as some other functional component, for example, an extended data services component (EDS) responsible for one or more data services, e.g., memory management for I/O operations.

Figure 1:
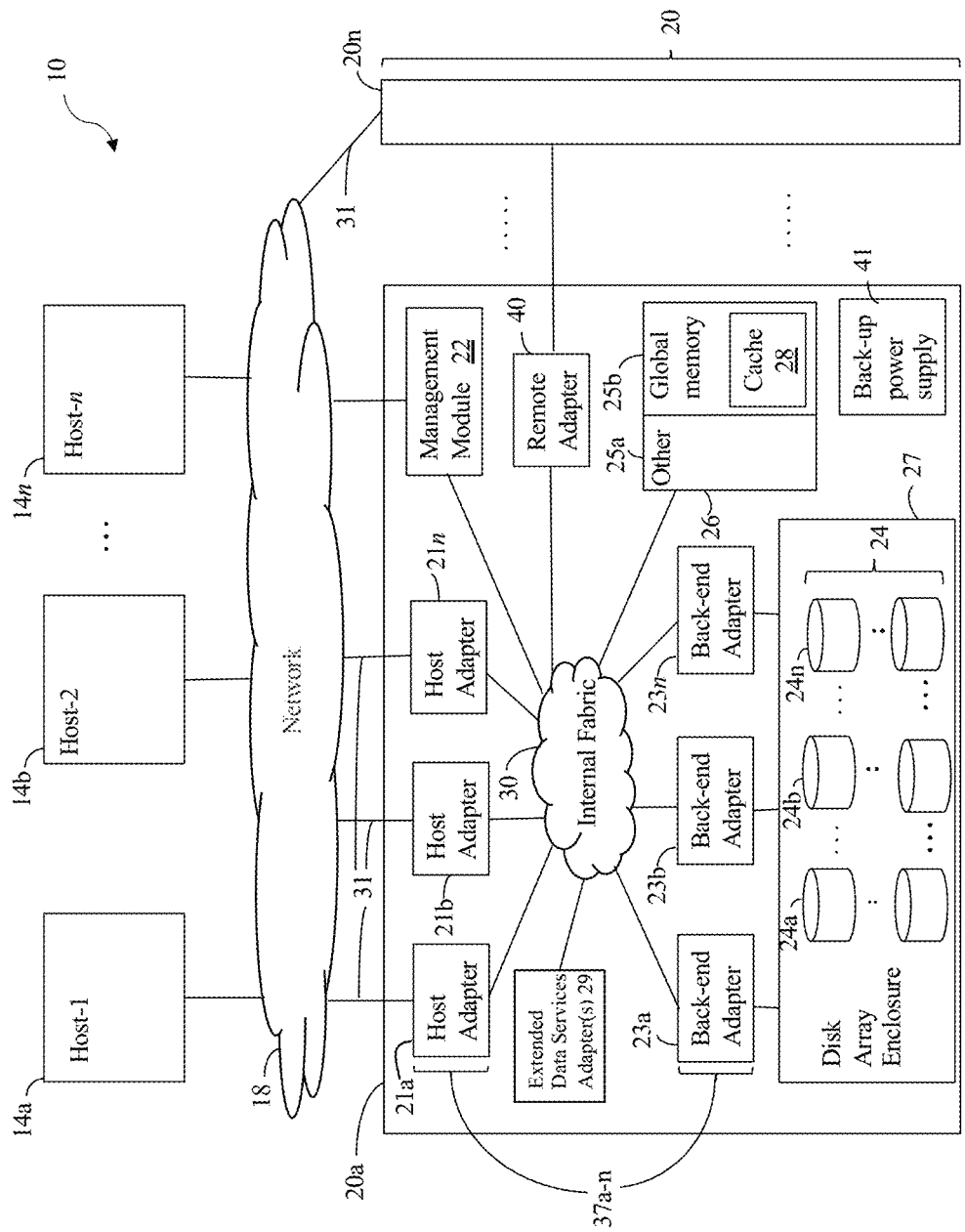
FIG. 1 is a block diagram illustrating an example of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BEA") (e.g., a director configured to serve as a BEA) responsible for the backend management of operations to and from a portion of the physical storage devices 24. A BEA is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BEA, such as 23a, may be responsible for the management of one or more (e.g., a row) of physical storage devices, such as row 24a. That is, in some configurations, all I/O communications with one or more physical storage devices 24 may be controlled by a specific BEA. The BEAs 23a-n may employ one or more technologies in communicating with, and transferring data to/from, physical storage devices 24, for example, SAS, SATA or NVMe. For NVMe, to enable communication between each BEA and the physical storage devices that it controls, the storage system may include a PCIe switch for each physical storage device controlled by the BEA; i.e., connecting the physical storage device to the controlling BEA.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEAs and FAs. For example, an EDS may perform processing that manages metadata tables of information used by other directors such as BEAs in connection with I/O operations, data deduplication, and the like.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEAs, EDSs and RAs may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEAs 23a-n, EDSs 29, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs, or BEAs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BEA.

It should be noted that, although examples of techniques herein may be made with respect to a physical storage system and its physical components (e.g., physical hardware for each RA, EDS, BEA, FA and the like), the techniques herein may be performed in a physical storage system including one or more emulated or virtualized components (e.g., emulated or virtualized ports, emulated or virtualized EDSs, BEAs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEAs may be used in connection with facilitating communications to the associated physical storage device(s) based on LSU(s) mapped thereto.

Figure 2A:
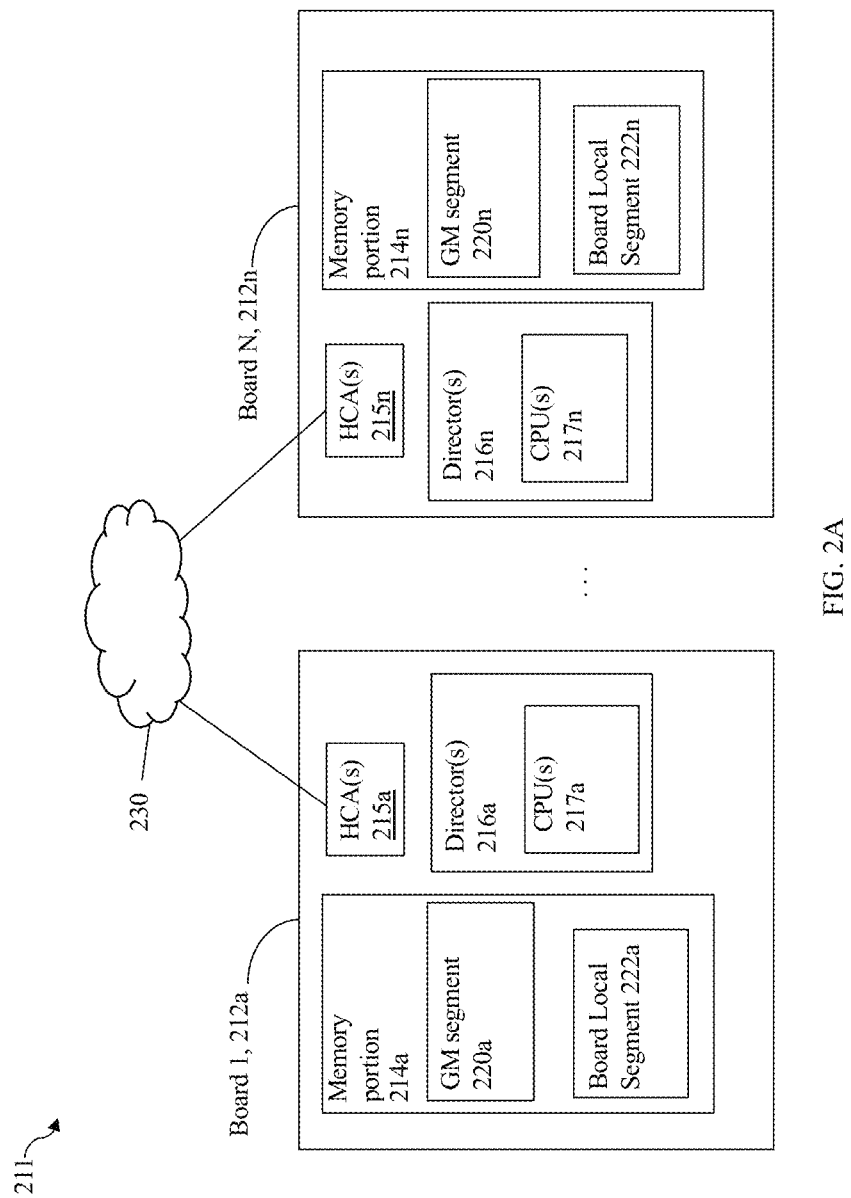
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more CPUs 217a including compute resources, for example, one or more cores or processing units and/or a CPU complex for processing I/O operations. One or more of the CPUs may be configured to function as one of the directors 37a-n described herein. For example, element 216a of board 212a may be configured to operate, such as by executing code, as any one or more of an FA, BEA, RA, and the like. In at least one embodiment, each of the directors may include a multicore CPU.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
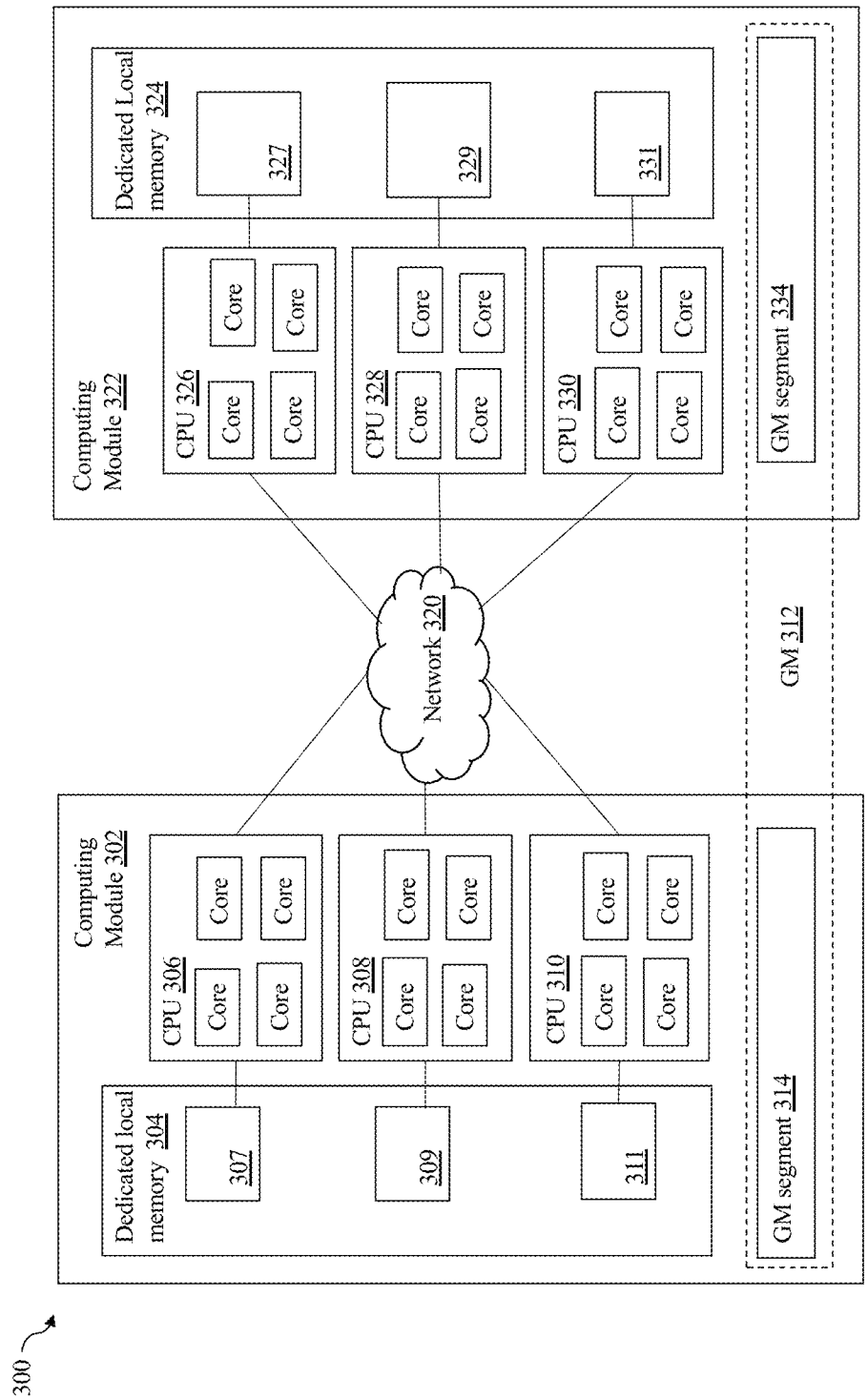
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
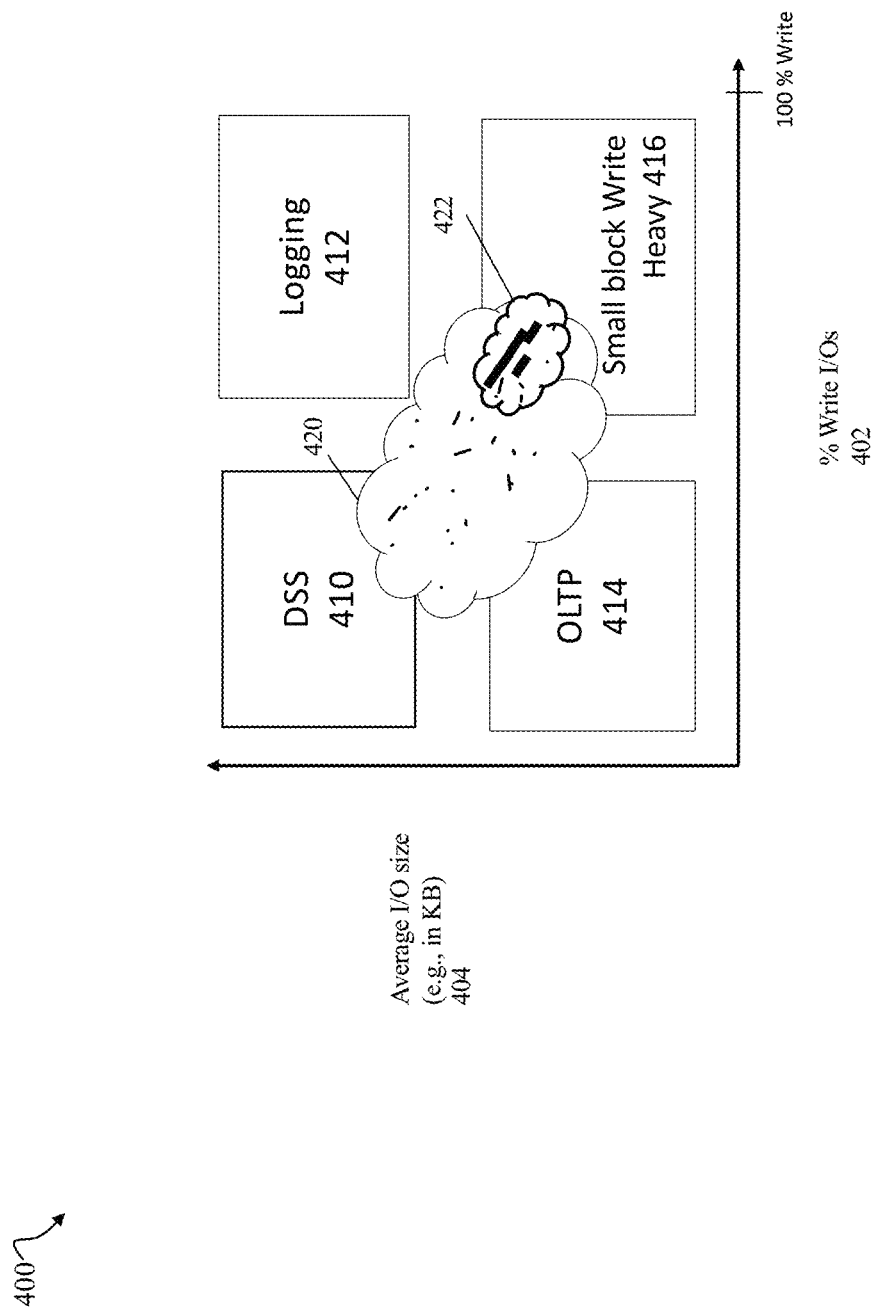
FIG. 3 is an example illustrating different types or classifications of I/O workloads od data storage systems in an embodiment in accordance with the techniques herein.

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component or director of a storage system, for example, an FA, BEA or EDS. More generally, one or more of the CPUs 306, 308, 310, 326, 328 and 330 may be configured (e.g., hardwired, hardcoded or programmed) as a functional component of a storage system, for example, an FA, BEA or EDS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEAs also have the necessary backend interfaces, such as interfaces to the various backend (BE) non-volatile physical storage devices (PDs) 24 of FIG. 1, to read data from, and write data to, such PDs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In the following paragraphs and examples provided for illustration of the techniques herein, reference may be made to a particular LSU, such as a LUN denoting a thin or virtually provisioned logical device. However, more generally, the techniques may be used in connection with any suitable LSU that may be supported and used in an embodiment.

In at least one embodiment, a LUN may a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN as noted elsewhere herein. With a thin LUN, the physical storage for the LUN may be allocated in blocks or chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin LUNs and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

In connection with data storage systems, it can be difficult to determine what particular hardware configurations meet the particular needs of different customers. For example, determining a hardware configuration of a data storage system for a customer may include determining the storage capacity of different storage tiers or drive types (e.g., the number of BE PDs of each storage tier), the number of engines or boards, and the like. As used herein an engine may be similar to a board or computing module such as described in connection with FIGS. 2A and 2B above, where each board or computing module includes a number of directors with CPUs, memory and other hardware components. The particular hardware configuration selected or customized for a customer may be based on one or more usage factors or criteria of the customer. For example, the criteria may include the I/O workload, the runtime I/O performance requirements of applications storing their data on the data storage system, the rate at which storage is consumed or used, the cost requirements that may be specified by the customer, and the like.

A hardware configuration for a customer may be over-provisioned in one or more aspects, such as storage capacity, BE PD performance, and/or the number of engines or boards, in order to avoid the possibility of having a hardware configuration that results in poor or lower than desired I/O performance (e.g., high I/O response times). Such overprovisioned hardware configurations may be more costly than needed and may include, for example, more hardware components than actually needed (e.g., more directors, memory and boards than needed) or more expensive higher performance BE PDs than needed (e.g., excessive storage capacity of flash or other non-volatile SSDs).

Described in the following paragraphs are techniques that may be used to provide a recommendation of different hardware configurations of a data storage system for a customer. The recommendation may be an upgrade recommendation as well as a recommendation for an initial configuration based on one or more criteria. The one or more criteria may include, for example, expected or actual I/O workload and possibly other characteristics.

In at least one embodiment in accordance with the techniques herein, a workload clustering mechanism may be used to characterize performance of the I/O workload of a particular customer's applications across a variety of different hardware configurations. The I/O performance, capacity usage, and more generally the behavior, achieved by a customer's data storage system may be monitored over time. When needed or desired, the techniques herein may be used to provide a recommendation of one or more hardware configurations for the customer based on the observed behavior particular to that customer. The recommendation provided for the customer may be based on collective known behavior of other multiple data storage systems across multiple customers. In at least one embodiment, the collective known behavior of different hardware configuration transitions or upgrades may be represented in a decision tree.

In at least one embodiment in accordance with the techniques herein, the decision tree may be used to represent the possible available hardware configurations as well as the changes or transitions between the different configurations. The transitions may also be referred to as actions or hardware upgrades previously taken by prior customers. In at least one embodiment, a customer may have a data storage system in a first configuration and the decision tree may be used to recommend upgrading from the first configuration to one or more other configurations.

The foregoing as well as other aspects of the techniques herein are described in more detail in the following paragraphs.

Referring to FIG. 3, shown is an example 400 illustrating I/O workload profiles for some standard applications and also illustrating the I/O workload of a particular customer's data storage system. The example 400 includes the % of write I/Os 402 on the X axis and the average I/O size 404, such as in KB (kilobytes) on the Y axis. In at least one embodiment, each data point (X, Y) may denote information for an observed time period or interval, such as a 5 minute time period or interval, where the Y coordinate denotes the average I/O size with respect to both read and write I/Os observed during the time period or interval, and the X coordinate denotes the percentage (%) of the observed I/Os during the time period or interval that are write I/Os.

The elements 410, 412, 414 and 416 may denote portions of the illustrated workload plane that are characteristic I/O workload profiles for 4 types of applications. The element 410 may denote the typical I/O workload profile, for example, of a decision support services (DSS) application that is mostly large sized read I/Os. DSS applications are known in the art and may be generally characterized as an information system that supports business or organizational decision-making activities. DSS applications serve the management, operations and planning levels of an organization (usually mid and higher management) and help people make decisions about problems that may be rapidly changing and not easily specified in advance, such as for both unstructured and semi-structured decision problems. The element 412 may denote the typical I/O workload profile, for example, of a logging or journaling application with large sequential write I/Os. The element 414 may denote the typical I/O workload profile, for example, of an OLTP (online transaction processing application) with generally small sized read I/Os. The element 416 may generally denote the typical I/O workload profile for an application that is write heavy with small sized I/Os.

The elements 410, 412, 414 and 416 may provide a frame of reference or comparison to a customer data storage system's I/O workload profile as denoted by the elements 420 and 422. More generally, the elements 410, 412, 414 and 416 may denote 4 predefined types, classifications or categories of I/O workloads as follows: type 1 410—large size, read heavy I/O workload; type 2 412—large size, write heavy I/O workload; type 3 414—small size, read heavy I/O workload; and type 4 416—large size, write heavy I/O workload. In at least one embodiment, an I/O workload type regarding the size of the I/O data payload may be classified as the large size I/O type if an average I/O size of the I/O data payload exceeds a specified threshold, where the specified threshold may be any suitable threshold. In at least one embodiment, an I/O workload type regarding the size of the I/O data payload may be classified as the small size I/O type if an average I/O size of the I/O data payload is less than a specified minimum threshold, where the specified minimum threshold may be any suitable threshold. In at least one embodiment, an I/O workload may be characterized as either write heavy or read heavy based on a percentage of observed I/Os that are writes. In at least one embodiment, an I/O workload may be characterized as write heavy where more than a specified threshold percentage of I/Os are writes, where the specified threshold percentage may be any suitable threshold. In at least one embodiment, an I/O workload may be characterized as read heavy where the percentage of observed write I/Os is less than a specified minimum percentage, where the specified minimum percentage may be any suitable percentage. Thus, the foregoing 4 types, classifications or categories of I/O workload profiles may be generally based on defined thresholds or boundary conditions of the X and Y values. In this manner in at least one embodiment, an observed I/O workload profile of a data storage system may be characterized as similar to one of the foregoing 4 types of classifications if the observed I/O workload profile falls into the boundary conditions or thresholds associated with the one type or classification.

The element 420 may generally represent a cluster of data points for a customer's data storage system and observed I/O workload. The element 422 may denote a subset of the data points of 420. In particular, the element 422 may denote a high concentration cluster of the data points for the customer's data storage system and observed I/O workload. The element 422 may include a majority of data points denoting the I/O workload of the customer's data storage system. Thus, the total I/O workload of the customer's data storage system may generally be represented as the region or cluster 420 that may be further characterized as mostly write heavy (as denoted by 422) but with a small amount of the I/O workload that falls into the DSS 410 category and also into the OLTP 414 category.

FIG. 3 represents a general characterization of a customer's data storage system I/O workload as compared to the standard or model I/O profiles denoted by 410, 412, 414 and 416. In connection with the customer data storage system's I/O workload characterized as represented by 420 and 422, it may be determined that the element 422 denotes a cluster that contains a majority of the data points within the overall cluster 420 thereby indicating that the customer's data storage system has an I/O workload that is dominantly small size, write heavy. However, the data storage system's workload also appears to change over time since some of the data points of 420 are also in the region 410 of the graph associated with DSS and the region 414 of the graph associated with OLTP.

In this example, there are 4 types, classifications or categories of I/O workload as described above and denoted by the elements 410, 412, 414 and 416 as in FIG. 3. More generally, an embodiment may have any suitable number of defined I/O workload types or classifications.

What will now be described in more detail is how to characterize and determine I/O workload features (sometimes referred to as workload features or features) for a data storage system in an embodiment in accordance with the techniques herein. In at least one embodiment, the I/O workload profile of a customer's data storage system may be characterized by the I/O workload features. As illustrated above in connection with the regions or clusters 420 and 422, the I/O workload features (sometimes also referred to as workload features) of a data storage system may be used to select one or more of the four I/O workload types or classifications (e.g., 410, 412, 414, 416) to characterize the I/O workload profile of the data storage system. In particular, a cluster of data points such as cluster 422 may be characterized by the I/O workload features particular to data points in that cluster. As also discussed elsewhere herein in more detail, sets of I/O workload features determined for data storage systems may be used to populate leaf nodes of a decision tree. The decision tree may be used in providing recommendations for hardware configuration changes or upgrades.

In connection with the techniques herein, as a first step S1, data may be collected for the observed I/O workload on a customer's data storage system at specified time intervals. For example, in at least one embodiment, the I/O workload information for a single (X,Y) data point may be collected each 5 minutes for a total amount of time such as, for example, 85 hours. Generally, any suitable time interval and total amount of time may be used. In at least one embodiment, each data point (X, Y) may be as described above in connection with FIG. 3 to denote information for an observed time period or interval, such as the 5 minute time period or interval mentioned above, where the Y coordinate denotes the average I/O size with respect to both read and write I/Os observed during the time period or interval, and the X coordinate denotes the percentage (%) of the observed I/Os during the time period or interval that are write I/Os.

Following the step S1, a step S2 may be performed to determine bins of the data points. In the step S2, bins denoting a contiguous sequential range of values are determined for the X and Y axes, and then the number of data points having values falling into the different bins may be counted. In this manner, a count or quantity may be determined for each defined bucket or bin.

Figure 4:
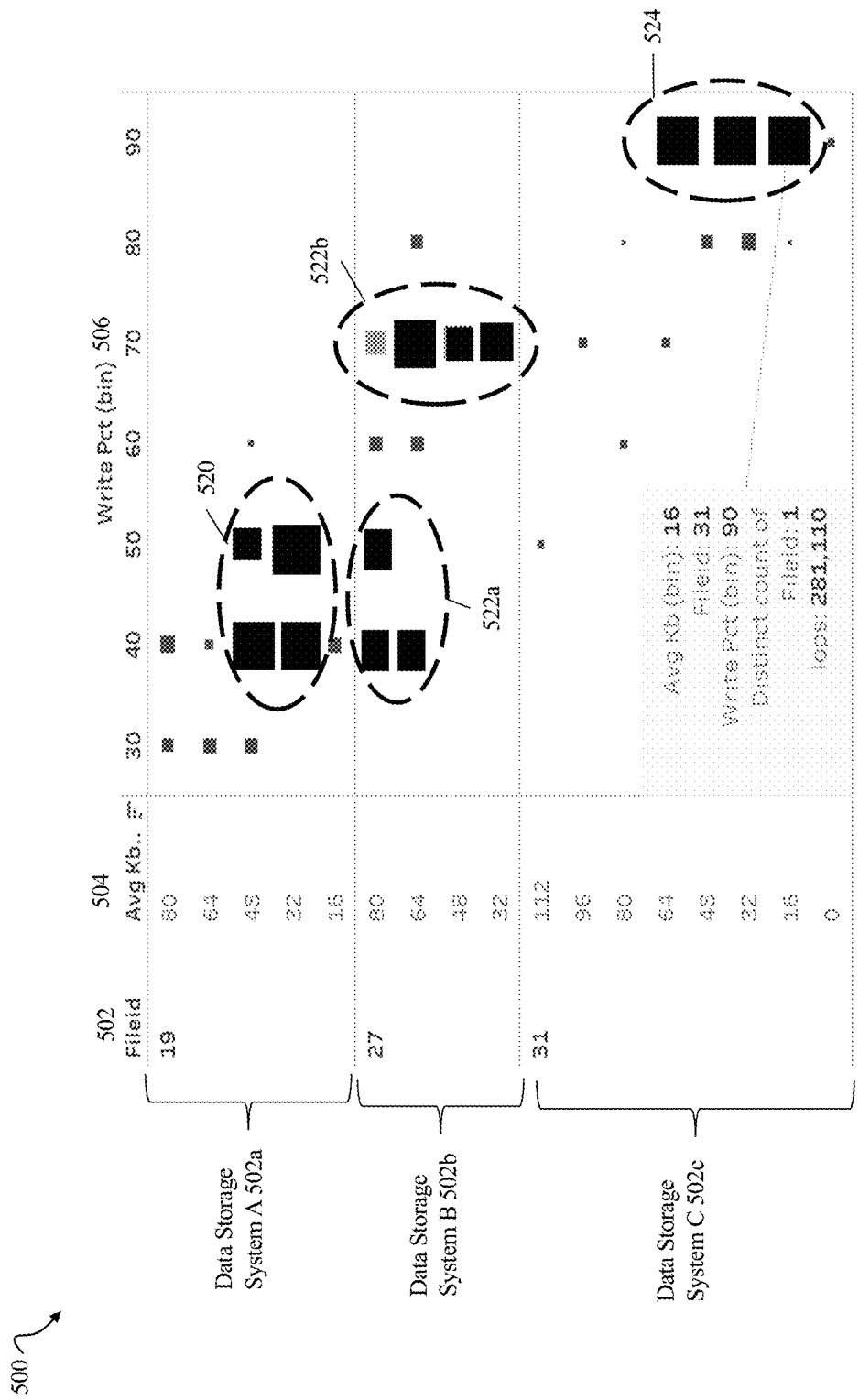
FIGS. 4 and 5 are examples illustrating binning and clustering of workload data in an embodiment in accordance with the techniques herein.

Referring to FIG. 4, shown is an example illustrating binning of the data points characterizing the I/O workload of customers' data storage systems in an embodiment in accordance with the techniques herein. In the example 500, shown are bins of data points for 3 customer data storage systems A 502a, B 502b and C 502c. The column 504 denotes the bins for the Y dimension corresponding to average I/O size, and the element 506 denotes the bins for the X dimension corresponding to the write I/O percentage.

In this example 500, the bin size for the X dimension is 10 and the bin size for the Y dimension is 16 although any suitable bin sizes may be used. As illustrated in FIG. 4 in the X dimension (denoting write I/O percentages), bin 1 may be 30-39, bin 2 may be 40-49%, bin 3 may be 50-59%, bin 4 may be 60-69%, bin 5 may be 70-79%, bin 6 may be 80-89, and bin 7 may be 90-99. As also illustrated in FIG. 4 in the Y dimension (denoting average I/O size in KB), bin 1 may be 0-15, bin 2 may be 16-31, bin 3 may be 32-47, bin 4 may be 48-63, bin 5 may be 64-79, bin 6 may be 80-96, bin 7 may be 96-112, and so on, as may be needed to capture the full range of I/O sizes.

In the example 500, the count or quantity in each bin may be denoted by a square. The square for a particular bin has a size that is scaled based on the number or quantity of data points falling into particular bin. The larger the square, the larger the quantity or number of data points. In this manner, the relative number of data points in each bin may be visually apparent based on the sizes of the squares.

In a step S3 subsequent to performing the step S2, clusters of data points may be identified. The clusters may generally denote groups of bins of data points having the highest quantities or counts. For example, the element 520 denotes a cluster of data points for the data storage system A 502a, the elements 522a-b denote 2 clusters of data points for the data storage system B 502b, and the element 524 denotes a cluster of data points for the data storage system C 502c. Generally, determining clusters of data points in the step S3 may be determined using any suitable technique. In at least one embodiment, a clustering algorithm may be used in the step S3 to determine clusters of collected data points to characterize the I/O workload of a data storage system.

As known in the art, cluster analysis is a branch of machine learning that groups the data that has not been labelled, classified or categorized. Clustering algorithms include a first type or class in which an input to the algorithm is the specified number of clusters to be discovered by the algorithm. A second type or class of clustering algorithms is where the number of clusters to be produced or discovered by the algorithm is not provided as an input. Rather, with the second type, the algorithm selects the number of clusters generated. Generally, any suitable clustering algorithm of either type may be used with the techniques herein.

In at least one embodiment, an algorithm of the first type of clustering algorithm noted above may be used where the algorithm is the K-Means algorithm, also known and referred to as Lloyd's algorithm. K-means is a clustering algorithm that partitions a set of points into K sets or clusters) such that the points in each cluster tend to be near each other in the plane or clustering space dimensions. The K-Means algorithm is an iterative method of cluster analysis. Initially, for a given k value, wherein "k" is the number of specified clusters to be generated or discovered by the algorithm, k random points in the plane are chosen to be the cluster centers, or centroids. Each input data point is assigned to the cluster whose centroid is closest to that point, based on Euclidean distance. Next, a new centroid are calculated for each cluster based on the mean of all the points previously assigned to that cluster. This process is repeated until convergence (centroids do not change), or until the maximum number of iterations is reached. The K-Means algorithm is well known and is described in more detail, for example, in "An Efficient k-Means Clustering Algorithm: Analysis and Implementation", Kanungo et al., IEEE Transactions on Pattern and Analysis and Machine Intelligence, Col. 24, No. 7. July 2002; and as described in the text book "Data Clustering: Algorithms and Applications", Edited by Charu C. Aggarwal, Chandan K. Reddy, Chapman and Hall/CRC Data Mining and Knowledge Discovery Series, First Edition, CRC Press, Taylor and Francis Group, LLC, 2014, ISBN-13: 978-1466558212 and ISBN-10: 1466558210; and "A comparative study of efficient initialization methods for the k-means clustering algorithm", Celebi et al, Expert Systems with Applications, Volume 40, Issue 1, January 2013, Pages 200-210.

In at least one embodiment, for each identified cluster for a data storage system's I/O workload, the I/O workload of the cluster may be characterized based on the data points included in the cluster. In this manner, the I/O workload of the data storage system may be characterized by the discovered clusters of data points.

In at least one embodiment, a set of I/O workload features may be determined for each cluster based on the data points included in that cluster. In such an embodiment, the clusters may be identified as described herein based on data points in the cluster, where each data point (X,Y) acquired at a point in time includes an X coordinate denoting the average I/O size and the percentage of write I/Os and a Y coordinate denoting the average I/O size. In at least one embodiment, a set of I/O workload features may be collected for each of the data points of the cluster, where the set of I/O workload features includes the average I/O size and the percentage of write I/Os and the average I/O size along with other metrics described in more detail elsewhere herein.

The I/O workload for the data storage system may also change over time, such as based on days of the week, particular times of the day, and the like. In this manner, an embodiment in accordance with the techniques herein may further partition the collected data points based on a time dimension and then bin and cluster such data points further partitioned based on time. For example, an embodiment in accordance with the techniques herein may modify the step S2 described above to further perform the binning of the data points as described in connection with FIG. 4 based on days of the week. To further illustrate, the data points collected in the step S1 may be partitioned into groups based on the day of the week when the data points are acquired, where the Monday group may denote the data points collected on Monday, the Tuesday group may denote the data points collected on Tuesday, the Wednesday group may denote the data points collected on Wednesday, and so on for the remaining days of the week. Subsequently, in the steps S2 and S3, each group of data points may be independently binned (step S2) and clustered (step S3). For example, the Monday group of data points may be independently binned and clustered as described in connection with FIG. 4, the Tuesday group of data points may be independently binned and clustered as described in connection with FIG. 4, and so on, for all the groups of data points. In this manner, one or more clusters may be identified for data points of each day of the week since the I/O workload may vary with the day of the week.

Figure 5:
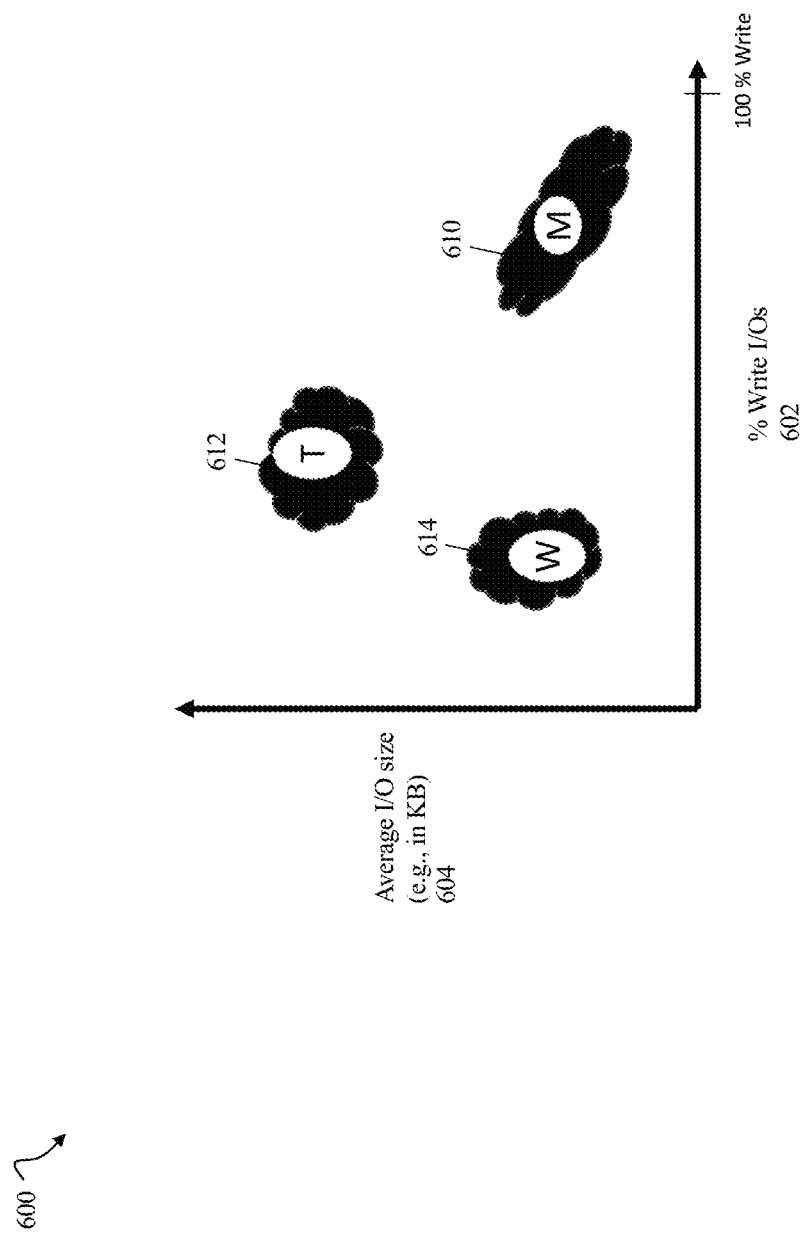

For example, referring to FIG. 5, illustrated are identified clusters of data points based on data further partitioned by day of the week. The example 600 includes a graphical illustration with the X axis denoting the % of write I/Os and the Y axis denoting the average I/O size 604 as described in connection with FIG. 3. In the example 600, the element 610 may denote a first cluster identified in connection with data points collected on Monday, a second cluster 612 is identified in connection with the data points collected on Tuesday, and a third cluster 614 is identified in connection with data points collected on Wednesday. The foregoing 3 clusters may generally fall into 3 different I/O workload types or classifications as described in connection with FIG. 3. For example, the cluster 614 from Wednesday's data points may generally correspond to the OLTP 414 with the small block size, read heavy I/O workload; the cluster 612 from Tuesday's data points may generally correspond to the DSS 410 with the large block size, ready heavy workload; and the cluster 610 may generally correspond to the small block size, write heavy workload. In this manner, the same data storage system is illustrated in FIG. 5 as having different I/O workloads on different days of the week.

The foregoing steps S1, S2 and S3 describe processing that may be performed to determine clusters of data points that characterize the I/O workload of a data storage system.

What will now be described is how the I/O workload characteristics of the clusters may be used with a decision tree in an embodiment in accordance with the techniques herein. A decision tree is a flowchart-like structure in which each internal node represents a "test" on an attribute or property, each branch represents the outcome of the test, and each leaf node represents a class label (decision taken after computing all attributes). The paths from root to leaf represent classification rules. In connection with the techniques herein, the decision tree may be constructed to represent all possible hardware configurations in a data storage system. As discussed in more detail below, each leaf node of the decision tree may represent a different hardware configuration and may be associated with one or more sets of I/O workload features of data storage systems having the particular hardware configuration of the leaf node.

In the following paragraphs, examples are provided of different possible hardware options that may be available for configuration in a data storage system. The examples may not include all options and components available for purposes of simplicity of illustration.

Figure 6:
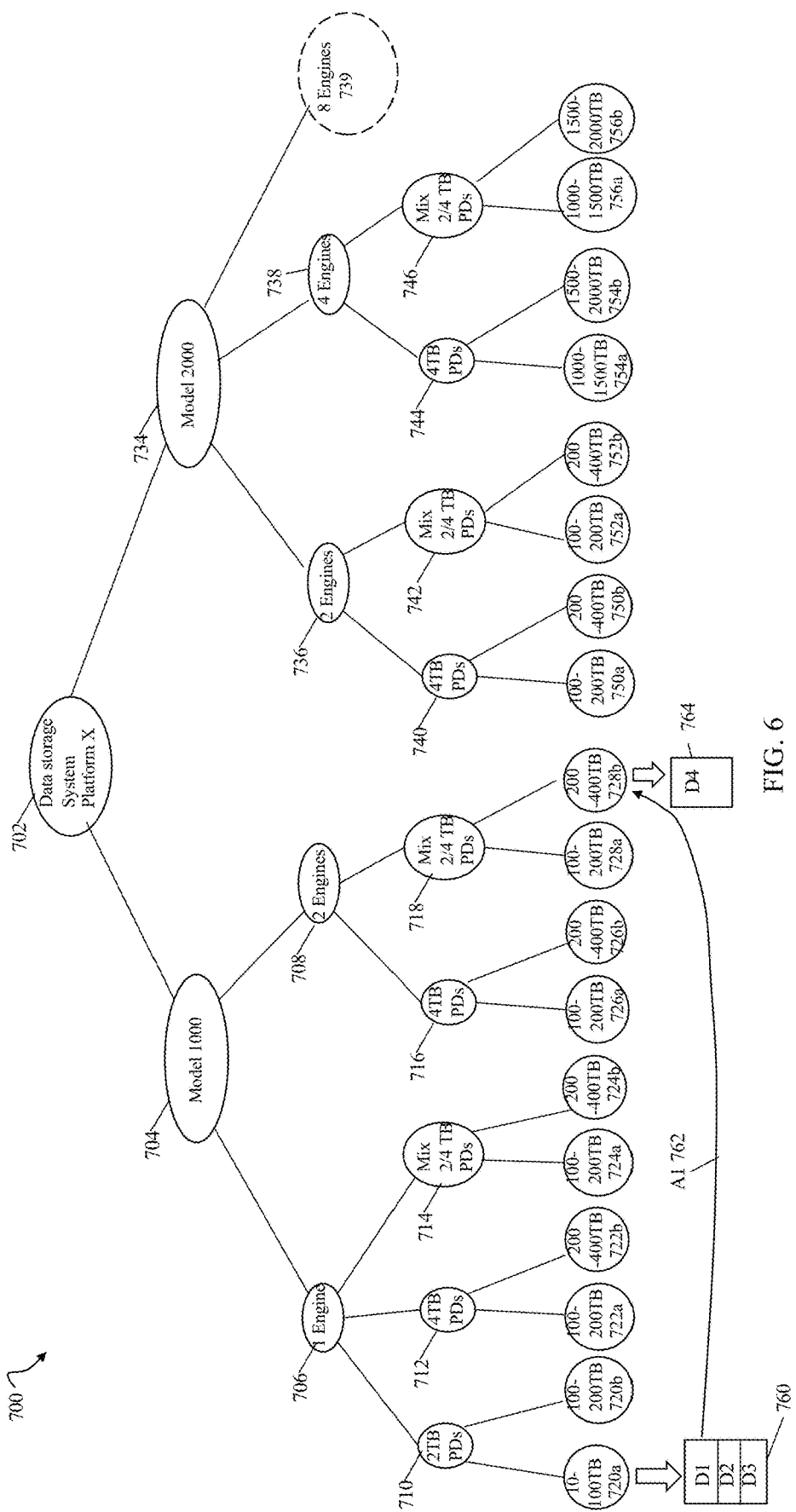
FIGS. 6 and 7 are examples illustrating a decision tree with leaf nodes and associated sets of I/O workload features and associated actions in an embodiment in accordance with the techniques herein.

Referring to FIG. 6, shown is an example 700 of a decision tree that may be built and used in an embodiment in accordance with the techniques herein. The example 700 illustrates a decision tree with multiple levels of nodes. The tree 700 is a decision tree with a hierarchy of levels of nodes used to make decisions. The tree 700 includes a first level or root level with the root node 702 denoting the data storage system platform X; a second level of nodes 704 and 734 denoting the different models of the data storage system platform X; a third level of nodes 706, 708, 736, 738 and 739 denoting the different engine counts available for the different models; a fourth level of nodes 710, 712, 714, 716, 718, 740, 742, 744, 746 denoting the different size backend (BE) non-volatile PDs; a fifth level of nodes 720a-b, 722a-b, 724a-b, 726a-b, 728a-b, 750a-b, 752a-b, 754a-b, and 756a-b denoting the total storage capacity provided by the BE PDs in the hardware configuration.

Each node in the tree 700, the node 702 represents a decision regarding what mode number data storage system is selected, the model 1000 denote by the node 704 or the model 2000 denoted by the node 734. For the model 1000 704, a decision is made as to whether to have a single engine configuration 706 or a 2 engine configuration 708. For the 1 engine configuration 706, the BE PDs may be 2 TB (terabyte) PDs 710, 4 TB PDs 712, or a mixture of 2 TB and 4 TB PDs 714. In the single engine configuration 706, if the BE PDs are 2 TBs 710, the total BE PD storage may be either in the range 10-100 TB 720a or 100-200 TB 720b. In the single engine configuration 706, if the BE PDs are 4 TBs 712, the total BE PD storage may be either in the range 100-200 TB 722a or 200-400 TB 722b. In the single engine configuration 706, if the BE PDs are a mixture of 2 TB and 4 TBs 714, the total BE PD storage may be either in the range 100-200 TB 724a or 200-400 TB 724b. For the 2 engine configuration 708, the BE PDs may be 4 TB PDs 716, or a mixture of 2 TB and 4 TB PDs 718. In the 2 engine configuration 708, if the BE PDs are 4 TBs 716, the total BE PD storage may be either in the range 100-200 TB 726a or 200-400 TB 726b. In the 2 engine configuration 708, if the BE PDs are a mixture of 2 TB and 4 TBs 718, the total BE PD storage may be either in the range 100-200 TB 728a or 200-400 TB 728b.

For the model 2000 734, a decision is made as to whether to have a single engine configuration 736, a 2 engine configuration 738, or an 8 engine configuration option 739. It should be noted that the element 739 may generally denote the subtree portion of nodes for the 8 engine configuration option of the model 2000 similar to other engine configuration options. The element 739 may denote 8 engine node option and all the other nodes corresponding to other configuration options available in the 8 engine configuration. The details of the subtree of descendant nodes denoted by the element 739 have been omitted for simplicity of illustration of the example 700.

For the 2 engine configuration 736, the BE PDs may be 4 TB PDs 740, or a mixture of 2 TB and 4 TB PDs 742. In the 2 engine configuration 736, if the BE PDs are 4 TBs 740, the total BE PD storage may be either in the range 100-200 TB 750a or 200-400 TB 750b. In the 2 engine configuration 736, if the BE PDs are a mixture of 2 TB and 4 TBs 742, the total BE PD storage may be either in the range 100-200 TB 752a or 200-400 TB 752b. In the 4 engine configuration 738, if the BE PDs are 4 TBs 744, the total BE PD storage may be either in the range 1000-1500 TB 754a or 1500-2000 TB 754b. In the 4 engine configuration 738, if the BE PDs are a mixture of 2 TB and 4 TBs 746, the total BE PD storage may be either in the range 1000-1500 TB 756a or 1500-2000 TB 756b.

Each path from the root node 702 to one of the leaf nodes represents one of the different hardware configurations available for a data storage system. Thus, each existing data storage system of platform X has a hardware configuration that is represented by a path from the root node 702 to a particular one of the leaf nodes in the tree 700.

In at least one embodiment, each different hardware configuration may have an associated configuration identifier (ID) that uniquely identifies the configuration from all other hardware configurations represented in the decision tree. The configuration ID of a hardware configuration may be based on the particular options selected and included in that particular configuration. In at least one embodiment, the configuration ID of a hardware configuration may encode the different component options included in the configuration. In at least one embodiment, the configuration ID may be a concatenation of the different component options included in the configuration. For example, consider a first configuration ID corresponding to a first hardware configuration represented by the path from the root node 702 to the leaf node 720a. In this case, the first configuration ID may be "X:1000:1:2:100" representing the platform X, model 1000, 1 engine, 2 TB BE PDs, and 100 TB of BE PD storage capacity.

Each leaf node of the tree 700 may be associated with one or more sets of I/O workload features characterizing the I/O workload of a data storage system having the particular hardware configuration represent by the leaf node. Thus, each of the leaf nodes of the decision tree 700 may be populated with sets of I/O workload features experienced or observed on data storage systems having the particular hardware configuration represented by the leaf node. In at least one embodiment, a set of I/O workload features may include the following metrics: I/O rate (e.g., number of I/Os per second), an average I/O size, a percentage of write I/Os, a percentage allocated denoting an amount of the total storage capacity of the BE PDs that is allocated or consumed, and I/O response time. It should be noted that generally, each set of I/O workload features may include any suitable I/O workload metrics or information. It should also be noted that the set of I/O workload features just described includes the average I/O size and the percentage of write I/Os which were used in binning the data points and forming the clusters of data points.

In at least one embodiment, each of the data point clusters identified for a data storage system may have a set of I/O workload features based on the data points of the cluster, and each such set of I/O workload features for a cluster may be associated with one of the leaf nodes depending on the particular hardware configuration of the data storage system. For example, reference is made back to FIG. 5. Assume that clustering has identified 3 clusters 610, 612 and 614 as described above for a data storage system having the hardware configuration represented by the above-noted first configuration ID associated with the leaf node 720a. Based on the data points included in the cluster 610, a first set D1 of I/O workload features may be determined. Based on the data points included in the cluster 612, a second set D2 of I/O workload features may be determined. Based on the data points included in the cluster 614, a third set D3 of I/O workload features may be determined. The leaf node 720a having the first configuration ID may be associated with the 3 sets D1, D2 and D3 of I/O workload features. Put another way, each of the 3 sets D1, D2 and D3 of I/O workload features may be labeled with the first configuration ID associated with the leaf node 720a. The element 760 may denote the sets D1, D2 and D3 of I/O workload features associated with the leaf node 720a. In this manner, the sets of I/O workload features associated with a leaf node representing a particular hardware configuration denote the different observed performance characteristics, utilization, and behavior experienced for the particular hardware configuration. In at least one embodiment, the sets of I/O workload features associated with a leaf node may be based on the cluster level of granularity.

In at least one embodiment, a set of I/O workload features for a cluster may be determined based on an aggregation of various sets of I/O workload features corresponding to the data points of the cluster. In at least one embodiment, although clusters may be formed using data points each based on only two metrics, the percentage of write I/Os and the average I/O size represented respectively by the X and Y coordinates of the data point, a complete set of I/O workload features may be collected for each 5 minute interval corresponding to each data point. In such an embodiment, the complete set of I/O workload features acquired for each 5 minute time interval may include the percentage of write I/Os and the average I/O size and may additionally include other metrics as described herein. The other metrics as described herein may include, for example, an I/O rate (e.g., I/Os per second), a percentage allocated denoting an amount of the total storage capacity of the BE PDs that is allocated or consumed, and I/O response time. Thus, the set of I/O workload features for the cluster may be based on the various sets of I/O workload features associated with the data points of the cluster. The various sets of I/O workload features associated with the data points of the cluster may be combined into the set of I/O workload features of the cluster using any suitable technique. In at least one embodiment, the foregoing various sets of I/O workload features associated with the data points of the cluster may be combined by using a moving average such as an exponential moving average (EMA). The EMA is a type of moving average (MA) that places a greater weight and significance on the most recent data points.

In at least one embodiment, many sets of I/O workload features may be obtained in connection with multiple different data storage systems of many customers. Such sets of I/O workload features may be associated with appropriate leaf nodes of the decision tree based on the particular hardware configurations of the data storage systems. Associating the different sets of I/O workload features from the different data storage systems having the same hardware configuration enables the decision tree model to learn the variety of different I/O workload characteristics experienced for the same hardware configuration.

The decision tree may also be populated with action IDs associated with leaf nodes. Generally, the action ID denotes a transition from a first leaf node representing a first hardware configuration to a second different leaf node representing a second hardware configuration. The transition represents a hardware configuration change made, such as a hardware upgrade, from the first hardware configuration to the second hardware configuration. The decision tree may be populated with action IDs as existing customer data storage systems make hardware configuration changes. In at least one embodiment, each action ID may identify the hardware configuration changes made. For example, consider the first configuration ID "X:1000:1:2:100" for the leaf node 720a. Assume that a customer's data storage system has a hardware configuration corresponding to the leaf node 720a and thus the first configuration ID. Now the customer upgrades the hardware configuration of the system to add 300 TB of additional BE PD storage capacity resulting in a total BE PD capacity of 400 TB using a mix of both 2 TB and 4 TB PDs. In this case, the customer's data storage system has transitioned from the configuration denoted by the leaf node 720a to the updated configuration denoted by the node 724b. The node 724b may have a second configuration ID of "X:1000:1:MIX24:400". In at least one embodiment, the action ID may be denote the delta or difference between the source or first configuration ID and the target or second configuration ID. In this example, the action ID may be action ID A1 having a value of "0:0:0:MIX24:400", where the action ID A1 includes a 0 for those options that did not change, where the action ID A1 includes MIX24 denoting that the BE PDs will now include both 2 TB and 4 TB PD, and where the action ID A1 includes 400 denoting the revised total BE capacity.

Assume that the sets D1, D2 and D3 of I/O workload features characterize the I/O workload for the data storage system DS1 at a first point in time when DS1 has the first configuration denoted by the first configuration ID associated with the leaf node 720a. At a second point in time subsequent to the first point in time, a new set of I/O workload features, D4, is received for the data storage system DS1. At the second point in time when D4 is obtained, the DS1 has a new hardware configuration denoted by the second configuration ID associated with the leaf node 728b. For each new set of I/O workload features received for the data storage system DS1, processing may be performed to determine an action ID as a delta or difference between the first configuration ID (denoting the hardware configuration associated with a prior set of I/O configuration data) and the second configuration ID (denoting the hardware configuration of the data storage system when the new set of I/O workload features is obtained). Thus, the first configuration ID denotes the hardware configuration of the data storage system immediately prior to transitioning to the second hardware configuration having the second configuration ID. If the delta or difference is not 0, whereby all elements of the action ID are not 0, then there has been a hardware configuration change in the data storage system. Otherwise, if the delta or difference is 0, whereby all elements of the action ID are all 0s, then there has not been a hardware configuration change in the data storage system. If the action ID is not 0 thereby denoting a hardware configuration change for the data storage system, processing may be performed to associate the action ID A1 with the sets D1-D3 of 760. In this case, the element 760 denotes the sets D1-D3 of I/O workload features of the data storage system DS1 when in the first hardware configuration (as represented by the leaf node 720a) immediately prior to making the hardware configuration change denoted by the action A1. In at least one embodiment, the set or sets of I/O workload features 706 prior to the hardware configuration change may be labeled with the action ID A1. The arrow 762 denotes the action A1, where the action A1 is the transition from the source or first hardware configuration and associated ID represented by the leaf node 720a to the target or second hardware configuration and associated ID represented by the leaf node 728b.

By recording the action ID denoting the hardware change or transition from the source or first hardware configuration to the target or second hardware configuration, the decision tree can record and learn the set of I/O workload features that caused or stimulated the change in the hardware configuration to from the source to the target hardware configuration.

Figure 7:
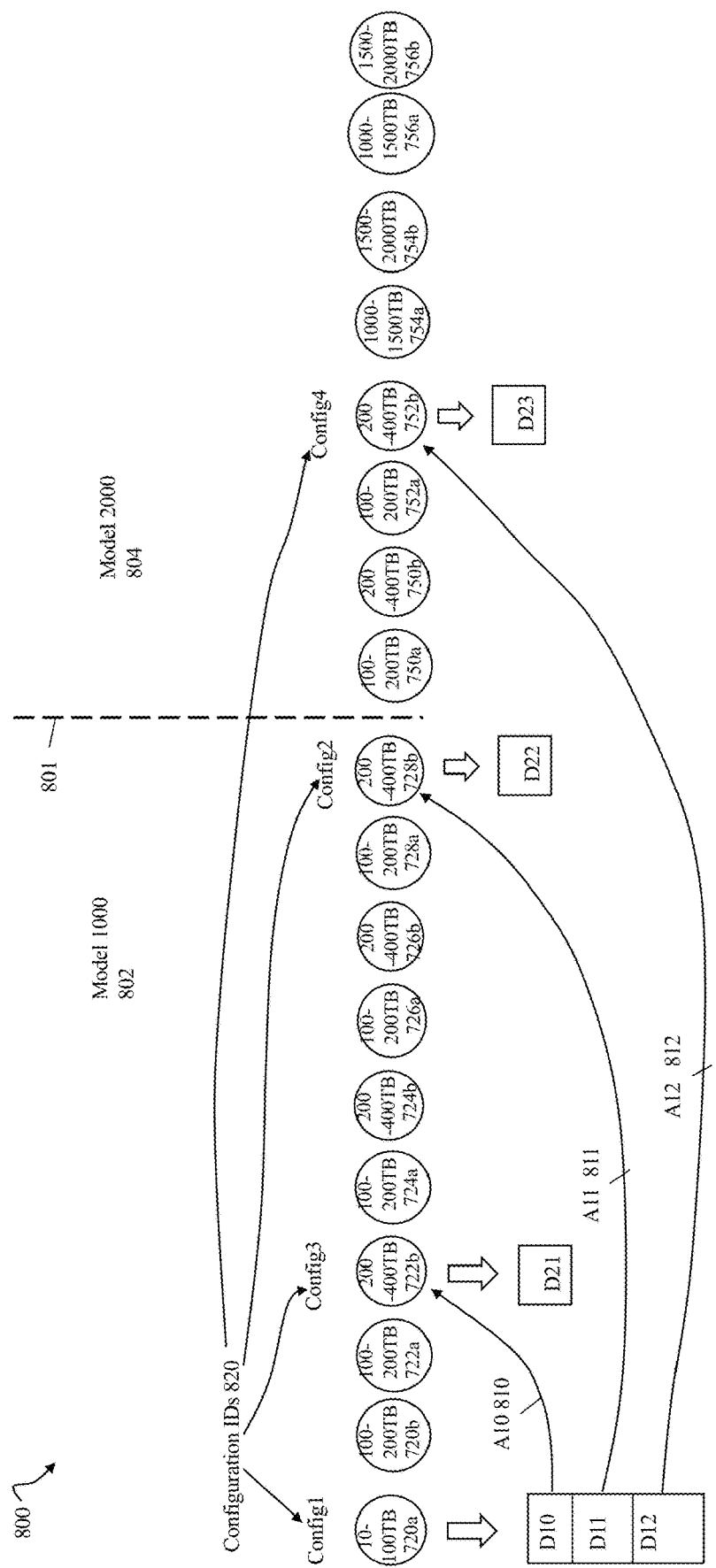

Referring to FIG. 7, shown is an example 800 illustrating leaf nodes of a decision tree populated with sets of I/O workload features and actions in an embodiment in accordance with the techniques herein. The example 800 includes only the leaf nodes of the decision tree of FIG. 6 for simplicity of illustration. The leaf nodes to the left of the dashed line 801 are leaf nodes that descend from the model 1000 node 704 of FIG. 6. The leaf nodes to the right of the dashed line 801 are leaf nodes that descend form the model 2000 node 734 of FIG. 6.

The element 820 denotes configuration IDs for 4 leaf nodes. In particular, the element 820 denotes the configuration ID of config1 for the leaf node 720a, the configuration ID of config2 for the leaf node 728b, the configuration ID of config3 for the leaf node 722b, and the configuration ID of config4 for the leaf node 725b.

The items D10, D11, D12, D21, D22 and D23 in FIG. 7 denote sets of I/O workload features for various clusters of different customer data storage systems. The sets D10, D11 and D12 denote sets of I/O workload features of data storage systems having the first hardware configuration denoted by config1 and the leaf node 720a. The set D22 denotes a set of I/O workload features of a data storage system having the second hardware configuration denoted by config2 and the leaf node 728b. The set D21 denotes a set of I/O workload features of a data storage system having a third hardware configuration denoted by config3 and the leaf node 722b. The set D23 denotes a set of I/O workload features of a data storage system having a fourth hardware configuration denoted by config4 and the leaf node 752b.

The action A10 810 is associated with the set D10 of I/O workload features whereby the data storage system DS10 made a hardware configuration change from the first hardware configuration (as represented by config1 and the leaf node 720a) to the third hardware configuration (as represented by config3 and the leaf node 722b). The action A10 810 denotes the delta or change from the first hardware configuration to the third hardware configuration.

The action A11 811 is associated with the set D11 of I/O workload features whereby the data storage system DS11 made a hardware configuration change from the first hardware configuration (as represented by config1 and the leaf node 720a) to the second hardware configuration (as represented by config2 and the leaf node 728b). The action A11 811 denotes the delta or change from the first hardware configuration to the second hardware configuration.

The action A12 812 is associated with the set D12 of I/O workload features whereby the data storage system DS12 made a hardware configuration change from the first hardware configuration (as represented by config1 and the leaf node 720a) to the fourth hardware configuration (as represented by config4 and the leaf node 752b). The action A12 812 denotes the delta or change from the first hardware configuration to the fourth hardware configuration.

The decision tree with the leaf nodes and actions as in the example 800 may be generated by adding the sets D10, D11, D12, D21, D22 and D23 of I/O workload features to the appropriate leaf nodes. In this manner the decision tree may be continually updated and populated with additional sets of I/O workload features as well as actions when a customer performs a hardware configuration change or upgrade.

Using the decision tree with the leaf nodes and actions as in the example 800, an embodiment in accordance with the techniques herein may provide upgrade path recommendations to a customer having the first hardware configuration as represented by config1 and the leaf node 720a. Such recommendations are based on the previous data storage system hardware changes or upgrades denoted by the actions A10 810, A11 811, and A12 812. For example, assume a customer has the data storage system DS20 that currently has the first hardware configuration denoted by config1 and the leaf node 720a. An embodiment in accordance with the techniques herein may examine the actions 810, 811 and 812 as potential or candidate hardware configuration changes to recommend to the customer for DS20.

Generally, the particular hardware configuration change or upgrade recommended may be based on one or one or more usage factors or criteria of the customer. For example, the criteria may include the I/O workload, the runtime I/O performance requirements of applications storing their data on the data storage system, the rate at which storage is consumed or used, the cost requirements that may be specified by the customer, and the like. For example, a cost may further be associated with each of the actions 810, 811 and 812, where the cost associated with an action denotes the monetary cost of performing the hardware configuration change associated with the action. For example, assume that DS20 has consumed or allocated about 90% of the total capacity of its BE PDs (e.g., DS20's allocated percentage of BE PD storage is about 90%) and the customer is looking for upgrade recommendations. However, for the customer, the monetary cost or price of the upgrade may be the top priority or criterion so the customer is looking for the lowest cost hardware upgrade that will provide for expanding the current BE PD storage capacity from 100 TB to 400 TB. The action A10 810 may have a first cost C1 for increasing the total storage capacity from 100 TBs to 400 TBs. The action A11 811 may have a second cost C2 for increasing the total storage capacity from 100 TBs to 400 TBs. Additionally this second cost C2 is greater than C1 since C2 includes an additional cost for upgrading from the single engine to the 2 engine configuration denoted by the leaf node 728b. The action A12 812 may have a third cost C3 for increasing the total storage capacity from 100 TBs to 400 TBs. Additionally this third cost C3 includes an additional cost for upgrading from the single engine version of the model 1000 to the 2 engine configuration of the model 2000 denoted by the leaf node. In this example C1<C2<C3 resulting in the candidate configuration changes or upgrade of the actions being ranked, from highest or first choice to last choice, as A10 810, A11 811, A12 812. In at least one embodiment, processing may be performed that determines the foregoing ranking and then recommends the hardware configuration change denoted by the action A10 810 since this is the least costly of all candidate configuration changes.

Additionally, assuming the customer having the data storage system DS20 selects to perform the hardware configuration change denoted by the action A10 810, the customer may also examine or view I/O performance features of D21 to provide the customer with an expectation or prediction regarding the performance and behavior that the customer may expect if DS20 is upgraded from the configuration denoted by the leaf node 720a to the upgraded configuration denoted by the leaf node 722b. For example, assume that the data storage system DS20 has observed I/O workload features which are similar to multiple I/O workload features of the set D21. For example, assume that the data storage system DS20 has observed values for the I/O rate, average I/O size, and write percentage that matches or is similar (e.g., within specified tolerances or thresholds) to corresponding values for such metrics in the set D21. In this case, the customer may expect to have an I/O response time similar to the I/O response time metric in the set D21. Although cost may be of primary importance to the customer, the customer may also consider expected I/O response time performance as secondary criterion in selecting a particular action and associated hardware configuration change. In this example, the customer may examine the particular value of the I/O response time metric in the set D21 and determine that the particular value in the set D21 is acceptable in terms of expected I/O performance, whereby the customer may select to perform the hardware configuration change denoted by the action A10 810.

As a variation, the customer may examine the particular value of the I/O response time metric in the set D21 and determine that the expected I/O response time denoted by the particular value is unacceptable in terms of expected I/O performance (e.g., the I/O response time in the set D21 may exceed a maximum allowable or acceptable I/O response time service threshold). In this latter variation, the customer may have criteria including the cost as the primary criterion and I/O performance as the secondary criterion. In this latter variation, the customer may require that the hardware configuration change selected meet both the specified cost and I/O performance criteria, whereby processing may eliminate the hardware configuration change denoted by the action A10 810 since although the customer's cost criterion is met, the customer's performance criterion is not met. In this latter variation, the techniques herein may alternatively recommend the hardware configuration change denoted by the action A11 811 having the associated cost C2. The data storage system DS20 may have observed values for the I/O rate, average I/O size, and write percentage that matches or is similar (e.g., within specified tolerances or thresholds) to corresponding values for such metrics in the set D22 associated with the leaf node 728b. In this case, the customer may expect to have an I/O response time similar to the I/O response time metric in the set D22 if the data storage system DS20 is upgraded to the hardware configuration represented by leaf node 728b by performing the hardware configuration changes denoted by the action A11 811. In this latter variation, the I/O response time in the set D22 may be less than the maximum allowable or acceptable I/O response time service threshold specified for performance for the customer's data storage system D20.

In this latter variation in at least one embodiment, the I/O workload features for the data storage system D20 may be classified or categorized as dominantly having one of the 4 types of I/O workloads 410, 412, 414, 416 as described in connection with FIG. 3. Although the I/O workload of clusters of the data storage system D20 may fall into multiple ones of the regions denoted by 410, 412, 414, 416 as described in connection with FIG. 3, the system D20 may be characterized as having a dominant one of the workload types 410, 412, 414 and 416. In at least one embodiment the dominant one workload type may be determined based on a workload cluster for DS20 falling into a particular one of the regions 410, 412, 414 and 416 where the cluster also has the largest number or count of data points with respect to any other clusters in other regions. As described in connection with FIG. 3, the cluster 422 may denote the dominant workload cluster in the region 416 having the most data points of any other cluster in any of the other regions 410, 412 and 414. Thus, the data storage system DS20's I/O workload may be characterized as one of the foregoing 4 defined types, classifications or categories. In a similar manner, sets of I/O workload features, such as D21 and D22, associated with resulting or target hardware configurations may be characterized as falling into one of the foregoing 4 defined types. If the type selected for the system DS20 matches the type selected for the set of I/O workload features associated with a target hardware configuration, then the system DS20 may expect to have I/O performance such as I/O response time as may be included in the set of I/O workload features associated with the target hardware configuration (e.g., where the set of I/O workload features is associated with a leaf node representing the target hardware configuration).

As another example, an embodiment in accordance with the techniques herein may select or rank the candidate hardware configuration changes denoted by the actions A10 810, A11 811 and A12 812 based on the percentage of prior customers that performed each hardware confirmation change or upgrade from the first hardware configuration denoted by the leaf node 720a. Processing in accordance with the techniques herein may associate a percentage with each of the actions A10 810, A11 811 and A12 812, where the percentage denotes a percentage of the time that the action was previously selected by customers upgrading from the first hardware configuration denoted by the leaf node 720a. In this manner, the techniques herein may provide a recommendation, or otherwise rank the configuration change candidates or actions, based on prior observed behavior regarding hardware configuration changes made for other data storage systems by other customers. For example, the action A10 810 may have been selected and performed 30% of the time, the action A11 811 may have been selected and performed 60% of the time, and the action A12 812 may have been selected and performed 10% of the time. In this case, processing may rank the actions and associated hardware configuration changes based on the percentage of time the actions have been previously selected and performed. The processing may determine a ranking, from highest percentage to lowest percentage, for the actions as A11 811, A10 810 and A12 812. In this example, the criterion used to select and recommend a hardware configuration change may be based on the foregoing percentages of times the candidate hardware configuration changes or actions have been previously taken. In this example, the techniques herein may recommend the hardware configuration change or upgrade associated with the action A11 811 having the highest percentage.

In at least one embodiment, a recommendation regarding a hardware configuration change or upgrade may be based on the occurrence of a trigger condition or event. The trigger may be based on one or more conditions such as, for example, based on one or more characteristics or features of the I/O workload of a data storage system. One or more upgrade triggers may be specified. In at least one embodiment, the upgrade triggers may include a trigger based on the percentage of the BE PD capacity that is allocated or used. For example, a maximum percentage threshold may be specified and if a set of I/O workload features for a system includes a current percentage of allocated BE PD capacity exceeding this maximum percentage threshold, then processing may be performed as described herein to recommend a hardware configuration change or upgrade for the data storage system.

In at least one embodiment, the upgrade triggers may include a trigger based on two or more features or characteristics of the I/O workload features of a data storage system. In at least one embodiment, the upgrade triggers may include a trigger based on the percentage of the BE PD capacity that is allocated or used and also the I/O response time. The trigger may specify to provide a recommendation for a hardware configuration upgrade or change if a set of I/O workload features for a system includes a current percentage of allocated BE PD capacity exceeding a maximum percentage threshold and also if the set of I/O workload features for the system includes a current I/O response time that exceeds a specified maximum response time. In at least one embodiment, the upgrade triggers may include a trigger based on the percentage of the BE PD capacity that is allocated or used and also the I/O rate (e.g., I/Os per second). The trigger may specify to provide a recommendation for a hardware configuration upgrade or change if a set of I/O workload features for a system includes a current percentage of allocated BE PD capacity exceeding a maximum percentage threshold and also if the set of I/O workload features for the system includes a current I/O rate that exceeds a specified maximum I/O rate threshold.

Figure 8:
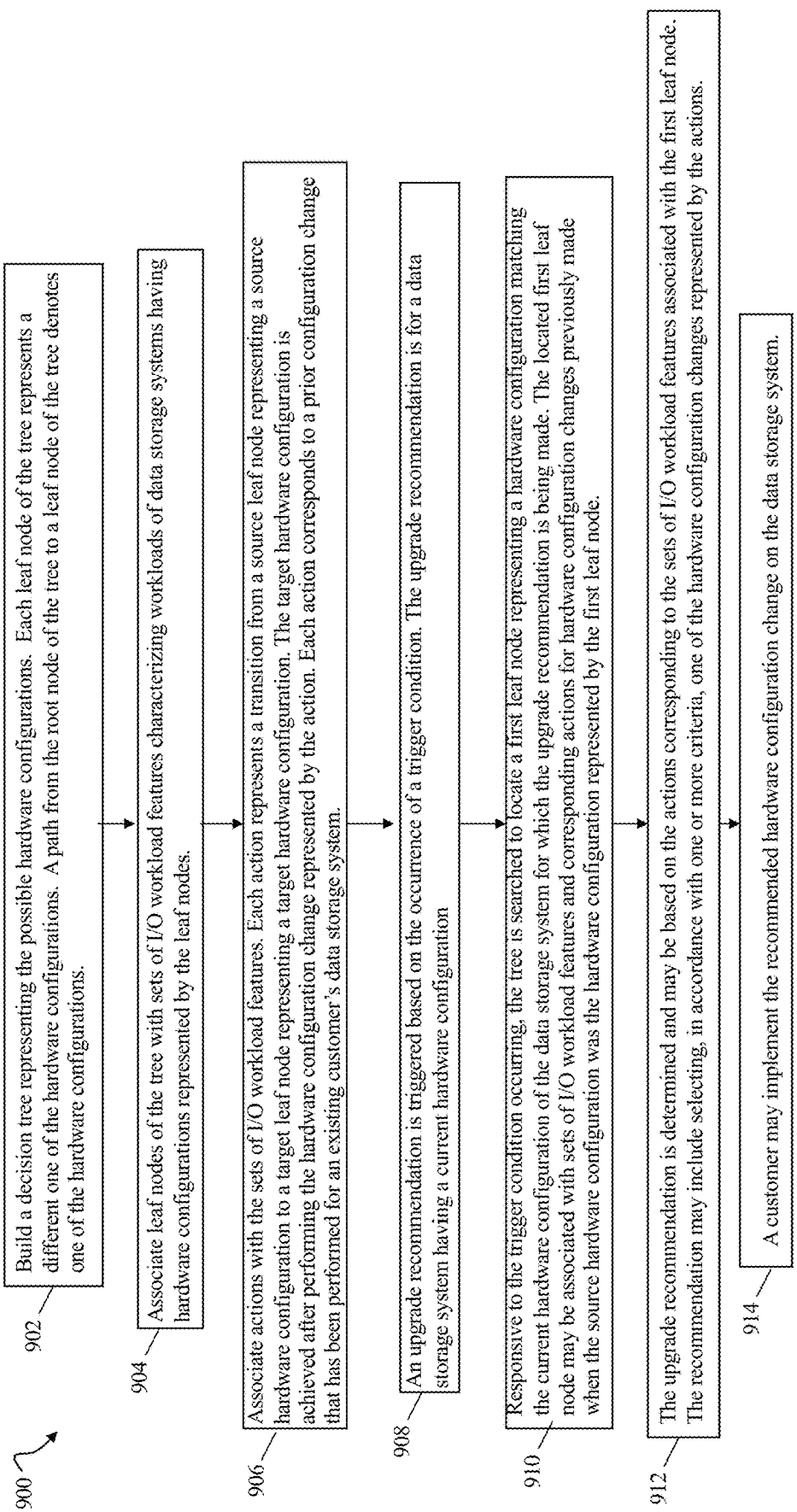
FIG. 8 is a flowchart of processing steps that may be performed in an embodiment in accordance with the techniques herein.

Referring to FIG. 8, shown is a flowchart 900 of processing steps that may be performed in an embodiment in accordance with the techniques herein.

At the step 902, processing may be performed to build a decision tree representing the possible hardware configurations. Each leaf node of the tree represents a different one of the hardware configurations. A path from the root node of the tree to a leaf node of the tree denotes one of the hardware configurations. From the step 902 control proceeds to the step 904.

At the step 904, leaf nodes of the tree may be associated with sets of I/O workload features characterizing workloads of data storage systems having hardware configurations represented by the leaf nodes. In at least one embodiment, the sets of I/O workload features may be determined for clusters of I/O workload data points. The clusters may be determined as a result of clustering and binning the I/O workload data points. From the step 904 control proceeds to the step 906.

At the step 906, processing may be performed to associate actions with the sets of I/O workload features of the leaf nodes. Each action represents a transition from a source leaf node (representing a source hardware configuration) to a target leaf node (representing a target hardware configuration). The target hardware configuration is achieved after performing the hardware configuration change represented by the action. Each action corresponds to a prior configuration change that has been performed for an existing customer's data storage system. From the step 906 control proceeds to the step 908.

At the step 908, an upgrade recommendation is triggered based on the occurrence of a trigger condition. The upgrade recommendation is for a data storage system having a current hardware configuration. From the step 908 control proceeds to the step 910.

At the step 910, responsive to the trigger condition of the step 908 occurring, the tree is searched to locate a first leaf node representing a hardware configuration matching the current hardware configuration of the data storage system for which the upgrade recommendation is being made. The located first leaf node may be associated with sets of I/O workload features and corresponding actions for hardware configuration changes previously made when the source hardware configuration was the hardware configuration represented by the first leaf node. From the step 910 control proceeds to the step 912.

At the step 912, the upgrade recommendation is determined and may be based on the actions corresponding to the sets of I/O workload features associated with the first leaf node. The recommendation may include selecting, in accordance with one or more criteria, one of the hardware configuration changes represented by the actions that corresponds to the sets of I/O workload features associated with the first leaf node. From the step 912 control proceeds to the step 914.

At the step 914, a customer may implement the recommended hardware configuration change, as provided in the step 912, on the data storage system.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of recommending configuration changes comprising:

receiving a decision tree that is a structure comprising a plurality of levels of nodes, wherein the decision tree includes a plurality of leaf nodes of the structure and each of the plurality of leaf nodes represents a different one of a plurality of hardware configurations, wherein each non-leaf node of the decision tree represents a test on an attribute or property, and each branch from one node at one of the plurality of levels to another node at another of the plurality of levels denotes an outcome or decision of a test associated with the one node, wherein a plurality of paths from a root of the decision tree to the plurality of leaf nodes represent a plurality of classification rules, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and performing first processing that determines, using the decision tree, a recommendation for a hardware configuration change for a second system currently having the first hardware configuration represented by the first leaf node.

2. The method of claim 1, wherein the first processing includes:

searching the decision tree for one of the plurality of leaf nodes having an associated one of the plurality of hardware configurations that matches a current hardware configuration of the second system, wherein said searching determines the first leaf node represents the first hardware configuration that matches the current hardware configuration of the second system; and ranking a plurality of hardware configuration changes represented by a plurality of actions associated with the first leaf node, wherein the plurality of hardware configuration changes includes the first hardware configuration change and wherein the plurality of actions includes the first action.

3. The method of claim 1, wherein the first processing is performed responsive to an occurrence of a trigger condition.

4. The method of claim 1, further comprising:
associating a new set of I/O workload features with the first leaf node.

5. The method of claim 2, wherein said ranking the plurality of hardware configuration changes is performed in accordance with one or more criteria.

6. The method of claim 5, wherein the first processing includes:
selecting the first hardware configuration change from the plurality of hardware configuration changes in accordance with the one or more criteria.

7. The method of claim 6, further comprising:
implementing the first hardware configuration change for the second system resulting in the second system having the second hardware configuration represented by the second leaf node.

8. A method of recommending configuration changes comprising:
receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and
performing first processing that determines, using the decision tree, a recommendation for a hardware configuration change for a second system currently having the first hardware configuration represented by the first leaf node, wherein the first processing includes:
searching the decision tree for one of the plurality of leaf nodes having an associated one of the plurality of hardware configurations that matches a current hardware configuration of the second system, wherein said searching determines the first leaf node represents the first hardware configuration that matches the current hardware configuration of the second system; and
ranking a plurality of hardware configuration changes represented by a plurality of actions associated with the first leaf node, wherein the plurality of hardware configuration changes includes the first hardware configuration change and wherein the plurality of actions includes the first action, wherein said ranking the plurality of hardware configuration changes is performed in accordance with one or more criteria, and wherein the one or more criteria includes any one or more of: a plurality of costs associated with the plurality of hardware configuration changes, a plurality of expected I/O response times for the plurality of hardware configuration changes, and a plurality of percentages each denoting a percentage of time that one of the plurality of configuration changes has been previously selected and performed.

9. A method of recommending configuration changes comprising:
receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and
performing first processing that determines, using the decision tree, a recommendation for a hardware configuration change for a second system currently having the first hardware configuration represented by the first leaf node, wherein the first processing is performed responsive to an occurrence of a trigger condition, and wherein the trigger condition includes any one or more of the following:
determining that the second system has allocated a current percentage of physical storage and the current percentage is greater than a specified threshold;
determining that the second system has a current I/O response time that exceeds a specified threshold; and
determining that the second system has current I/O rate that exceeds a specified threshold.

10. A method of recommending configuration changes comprising:
receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and
performing first processing that determines, using the decision tree, a recommendation for a hardware configuration change for a second system currently having the first hardware configuration represented by the first leaf node, and wherein the method further comprises:
associating a new set of I/O workload features with the first leaf node; and clustering a plurality of I/O workload data points and associated sets of I/O workload features, wherein said clustering includes forming one or more clusters of I/O workload data points having associated sets of I/O workload features.

11. The method of claim 10, wherein said clustering clusters the plurality of I/O workload data points along a plane of average I/O size and percentage of write I/O operations.

12. The method of claim 11, further comprising binning the plurality of I/O workload data points.

13. The method of claim 12, wherein a first axis of the plane corresponding to the average I/O size is partitioned into a first plurality of bins and a second axis of the plane corresponding to the percentage of write I/O operations is partitioned into second plurality of bins.

14. The method of claim 13, wherein each of the plurality of I/O workload data points is located in one of the first plurality of bins and in one of the second plurality of bins.

15. The method of claim 14, wherein said clustering includes determining a plurality of counts wherein each of the plurality of counts is associated with a first particular one of the first plurality of bins and a second particular one of the second plurality of bins, and wherein said each count denotes a total quantity of the plurality of I/O workload data points located in the first particular one of the first plurality of bins and also located in the second particular one of the second plurality of bins.

16. A system comprising:
one or more processors; and
a memory comprising code stored thereon that, when executed, performs a method of recommending configuration changes comprising:
receiving a decision tree that is a structure comprising a plurality of levels of nodes, wherein the decision tree includes a plurality of leaf nodes of the structure and each of the plurality of leaf nodes represents a different one of a plurality of hardware configurations, wherein each non-leaf node of the decision tree represents a test on an attribute or property, and each branch from one node at one of the plurality of levels to another node at another of the plurality of levels denotes an outcome or decision of a test associated with the one node, wherein a plurality of paths from a root of the decision tree to the plurality of leaf nodes represent a plurality of classification rules, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and
performing first processing that determines, using the decision tree, a recommendation for a hardware configuration change for a second system currently having the first hardware configuration represented by the first leaf node.

17. A non-transitory computer readable medium comprising code stored thereon that, when executed, performs a method of recommending configuration changes comprising:
receiving a decision tree that is a structure comprising a plurality of levels of nodes, wherein the decision tree includes a plurality of leaf nodes of the structure and each of the plurality of leaf nodes represents a different one of a plurality of hardware configurations, wherein each non-leaf node of the decision tree represents a test on an attribute or property, and each branch from one node at one of the plurality of levels to another node at another of the plurality of levels denotes an outcome or decision of a test associated with the one node, wherein a plurality of paths from a root of the decision tree to the plurality of leaf nodes represent a plurality of classification rules, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and
performing first processing that determines, using the decision tree, a recommendation for a hardware configuration change for a second system currently having the first hardware configuration represented by the first leaf node.

18. A system comprising:
one or more processors; and
a memory comprising code stored thereon that, when executed, performs a method of recommending configuration changes comprising:
receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and
performing first processing that determines, using the decision tree, a recommendation for a hardware configuration change for a second system currently having the first hardware configuration represented by the first leaf node, wherein the first processing includes:
searching the decision tree for one of the plurality of leaf nodes having an associated one of the plurality of hardware configurations that matches a current hardware configuration of the second system, wherein said searching determines the first leaf node represents the first hardware configuration that matches the current hardware configuration of the second system; and ranking a plurality of hardware configuration changes represented by a plurality of actions associated with the first leaf node, wherein the plurality of hardware configuration changes includes the first hardware configuration change and wherein the plurality of actions includes the first action, wherein said ranking the plurality of hardware configuration changes is performed in accordance with one or more criteria, and wherein the one or more criteria includes any one or more of: a plurality of costs associated with the plurality of hardware configuration changes, a plurality of expected I/O response times for the plurality of hardware configuration changes, and a plurality of percentages each denoting a percentage of time that one of the plurality of configuration changes has been previously selected and performed.

19. A non-transitory computer readable medium comprising code stored thereon that, when executed, performs a method of recommending configuration changes comprising:

receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and performing first processing that determines, using the decision tree, a recommendation for a hardware configuration change for a second system currently having the first hardware configuration represented by the first leaf node, wherein the first processing includes:

searching the decision tree for one of the plurality of leaf nodes having an associated one of the plurality of hardware configurations that matches a current hardware configuration of the second system, wherein said searching determines the first leaf node represents the first hardware configuration that matches the current hardware configuration of the second system; and ranking a plurality of hardware configuration changes represented by a plurality of actions associated with the first leaf node, wherein the plurality of hardware configuration changes includes the first hardware configuration change and wherein the plurality of actions includes the first action, wherein said ranking the plurality of hardware configuration changes is performed in accordance with one or more criteria, and wherein the one or more criteria includes any one or more of: a plurality of costs associated with the plurality of hardware configuration changes, a plurality of expected I/O response times for the plurality of hardware configuration changes, and a plurality of percentages each denoting a percentage of time that one of the plurality of configuration changes has been previously selected and performed.

20. A system comprising:

one or more processors; and a memory comprising code stored thereon that, when executed, performs a method of recommending configuration changes comprising:

receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and performing first processing that determines, using the decision tree, a recommendation for a hardware configuration change for a second system currently having the first hardware configuration represented by the first leaf node, wherein the first processing is performed responsive to an occurrence of a trigger condition, and wherein the trigger condition includes any one or more of the following:

determining that the second system has allocated a current percentage of physical storage and the current percentage is greater than a specified threshold;

determining that the second system has a current I/O response time that exceeds a specified threshold; and determining that the second system has current I/O rate that exceeds a specified threshold.

21. A non-transitory computer readable medium comprising code stored thereon that, when executed, performs a method of recommending configuration changes comprising:

receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and performing first processing that determines, using the decision tree, a recommendation for a hardware configuration change for a second system currently having the first hardware configuration represented by the first leaf node, wherein the first processing is performed responsive to an occurrence of a trigger condition, and wherein the trigger condition includes any one or more of the following:

determining that the second system has allocated a current percentage of physical storage and the current percentage is greater than a specified threshold;

determining that the second system has a current I/O response time that exceeds a specified threshold; and determining that the second system has current I/O rate that exceeds a specified threshold.

22. A system comprising:

one or more processors; and a memory comprising code stored thereon that, when executed, performs a method of recommending configuration changes comprising:

receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and performing first processing that determines, using the decision tree, a recommendation for a hardware configuration change for a second system currently having the first hardware configuration represented by the first leaf node, and wherein the method further comprises:

associating a new set of I/O workload features with the first leaf node; and clustering a plurality of I/O workload data points and associated sets of I/O workload features, wherein said clustering includes forming one or more clusters of I/O workload data points having associated sets of I/O workload features.

23. A non-transitory computer readable medium comprising code stored thereon that, when executed, performs a method of recommending configuration changes comprising:

receiving a decision tree comprising a plurality of levels of nodes, wherein the decision tree includes a plurality of leaf nodes and each of the plurality of leaf nodes represents a different one of a plurality of hardware configurations, wherein a first of the plurality of leaf nodes represents a first hardware configuration and the first leaf node is associated with a first set of I/O workload features denoting a first I/O workload of a first system having the first hardware configuration, wherein the first set of I/O workload features is associated with a first action from the first leaf node to a second leaf node, wherein the second leaf node represents a second hardware configuration and the first action represents a first hardware configuration change made to transition from the first hardware configuration to the second hardware configuration; and performing first processing that determines, using the decision tree, a recommendation for a hardware configuration change for a second system currently having the first hardware configuration represented by the first leaf node, and wherein the method further comprises:

associating a new set of I/O workload features with the first leaf node; and clustering a plurality of I/O workload data points and associated sets of I/O workload features, wherein said clustering includes forming one or more clusters of I/O workload data points having associated sets of I/O workload features.

* * * * *